US006804670B2

(12) United States Patent
Kreulen et al.

(10) Patent No.: US 6,804,670 B2
(45) Date of Patent: Oct. 12, 2004

(54) METHOD FOR AUTOMATICALLY FINDING FREQUENTLY ASKED QUESTIONS IN A HELPDESK DATA SET

(75) Inventors: Jeffrey Thomas Kreulen, San Jose, CA (US); Justin Thomas Lessler, San Jose, CA (US); Michael Ponce Sanchez, Tustin, CA (US); William Scott Spangler, San Martin, CA (US)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 09/935,473

(22) Filed: Aug. 22, 2001

(65) Prior Publication Data

US 2003/0050908 A1 Mar. 13, 2003

(51) Int. Cl.[7] .............................. G06F 17/30; G06F 7/00; G06F 17/00
(52) U.S. Cl. .................... 707/7; 707/3; 707/5; 707/102
(58) Field of Search ............................... 707/3, 6, 102, 707/1, 7, 5; 382/225; 704/9, 4, 235, 257; 706/45; 434/350

(56) References Cited

U.S. PATENT DOCUMENTS

| | | | |
|---|---|---|---|
| 5,141,439 A | | 8/1992 | Cousins ...................... 434/178 |
| 5,423,038 A | | 6/1995 | Davis ......................... 395/650 |
| 5,485,601 A | | 1/1996 | Ching ......................... 395/500 |
| 5,842,221 A | * | 11/1998 | Schmonsees ............. 707/104.1 |
| 5,974,412 A | * | 10/1999 | Hazlehurst et al. ............. 707/3 |
| 6,018,736 A | * | 1/2000 | Gilai et al. ..................... 707/6 |
| 6,024,571 A | | 2/2000 | Renegar ...................... 434/157 |
| 6,028,601 A | | 2/2000 | Machiraju et al. .......... 345/336 |
| 6,137,911 A | * | 10/2000 | Zhilyaev ..................... 382/225 |
| 6,253,169 B1 | * | 6/2001 | Apte et al. ...................... 704/9 |
| 6,584,464 B1 | * | 6/2003 | Warthen ........................ 707/4 |
| 6,618,725 B1 | * | 9/2003 | Fukuda et al. ................. 707/6 |
| 6,665,640 B1 | * | 12/2003 | Bennett et al. ............. 704/257 |
| 2002/0023144 A1 | * | 2/2002 | Linyard et al. ............. 709/218 |
| 2003/0217052 A1 | * | 11/2003 | Rubenczyk et al. ........... 707/3 |

OTHER PUBLICATIONS

K. Hammond, R. Burke, C. Martin, and S. Lytinen (1995), FAQ Finder: A Case–Based Approach to Knowledge Navigation, pp. 80–86.*

Kevin Crowston and Marie Williams (1999), The Effects of Linking on Genres of Web Documents.*

* cited by examiner

*Primary Examiner*—Safet Metjahic
*Assistant Examiner*—Merilyn Nguyen
(74) *Attorney, Agent, or Firm*—Samuel A. Kassatly (57) ABSTRACT

A system and method automatically identify candidate helpdesk problem categories that are most amenable to automated solutions. The system generates a dictionary wherein each word in the text data set is identified, and the number of documents containing these words is counted, and a corresponding count is generated. The documents are partitioned into clusters. For each generated cluster, the system sorts the dictionary terms in order of decreasing occurrence frequency. It then determines a search space by selecting the top dictionary terms as specified by a user defined depth of search. Next, the system chooses a set of terms from the search space as specified by a user-defined value indicating the desired level of detail. For each possible combination of frequent terms in the search space, the system finds the set of examples containing all the terms, and then determines if the frequency is sufficiently high and the overlap sufficiently low for this candidate set of examples to be a frequently asked question.

22 Claims, 7 Drawing Sheets

| | FAQ Name | Class Name | FAQ Size | Percentage |
|---|---|---|---|---|
| 1 | | install | 135 | 2.02 |
| 2 | note address book | address | 114 | 1.710 |
| 3 | receive email note | email | 72 | 1.080 |
| 4 | afs password reset | password | 70 | 1.05 |
| 5 | afs quota increase | afs | 66 | 0.990 |
| 6 | note email database | database | 60 | 0.9 |
| 7 | note email address | email | 56 | 0.84 |
| 8 | lotus note id | note | 54 | 0.810 |
| 9 | copy file note | note | 49 | 0.730 |
| 10 | print server respond | server | 48 | 0.720 |
| 11 | note send email | email | 48 | 0.720 |
| 12 | reset afs password | reset | 47 | 0.7 |
| 13 | print server reboot | server | 46 | 0.69 |
| 14 | email database click | database | 44 | 0.660 |
| 15 | note calendar profile | calendar | 43 | 0.64 |
| 16 | send email address | email | 38 | 0.57 |
| 17 | network connection connect | network,connect | 32 | 0.48 |
| 18 | afs userid password | password | 30 | 0.45 |
| 19 | release home page | page,web,refresh | 28 | 0.42 |
| 20 | error reboot system | system,reboot | 24 | 0.360 |
| | TOTAL | | 979 | 14.640 |

*double click on a FAQ to view its supporting examples

[Supporting Examples] [Rename] [Delete]

[Regenerate] [Save] [Cancel]

FIG. 7

METHOD FOR AUTOMATICALLY FINDING FREQUENTLY ASKED QUESTIONS IN A HELPDESK DATA SET

CROSS-REFERENCE TO RELATED APPLICATION

This application is related to co-pending U.S. patent application Ser. No. 09/629,831, filed on Oct. 29, 1999, and titled "System and Method for Interactive Classification and Analysis of Data," which is assigned to the same assignee as the present invention, and which is incorporated herein by reference.

FIELD OF THE INVENTION

The present invention generally relates to a system and method for classifying and analyzing data, and is particularly applicable to a method for automatically generating a list of "Frequently Asked Questions" or FAQs, by analyzing data sets describing calls and responses received at a help desk.

BACKGROUND OF THE INVENTION

As technology becomes ever more pervasive it has become increasingly common for organizations to provide a helpdesk service to their customers. Typically, a customer will call the helpdesk to ask for information and to seek solutions to problems relating to the operation of products, the performance of services, necessary procedures and forms, etc.

Typically, helpdesks are staffed by knowledgeable human operators, who often spend considerable time with each caller in order to answer the caller's questions. As a result, helpdesk operation could be quite expensive to maintain.

Much of the helpdesk operator's time is spent solving identical or nearly identical problems over and over again. A need arises for a technique by which the solutions to frequently recurring problems may be automated in order to improve the efficiency of helpdesk operation. In particular, what is needed is a technique that can aid in identification of helpdesk inquiry and problem categories that are most amenable to automated fulfillment or solution.

SUMMARY OF THE INVENTION

The present invention is useful in identifying candidate helpdesk problem categories that are most amenable to automated solutions. In a preferred embodiment, the present invention uses clustering techniques to identify collections of problems from free form text descriptions. It then facilitates a human user's modifications to collections as appropriate to improve the coherence and usefulness of the classification. Measures such as the level of detail, the depth of search, the confidence level, and overlap levels, are used to help the user determine which set of examples are the best candidates to become a FAQ.

The present invention describes a method, system, and a computer program product for interactive classification and analysis. In order to carry out the method, a dictionary is generated whereby each word in the text data set is identified, and the number of documents containing these words is counted. The most frequently occurring words in the corpus compose a dictionary. A count of occurrences of each word in the dictionary within each document in the document set is generated. The count may be generated by generating a matrix having rows and columns, each column corresponding to a word in the dictionary, each row corresponding to an example in the text corpus, and each entry representing a number of occurrences of the corresponding word in each example.

The set of documents may be partitioned by partitioning the set of examples into a plurality of clusters using a k-means partitioning procedure. The k-means partitioning procedure may include determining a distance between a centroid and an example vector using a distance function of:

$$d(X,Y) = -X \cdot Y / \|X\| \cdot \|Y\|$$

wherein X is the centroid, Y is the example vector, and d(X,Y) is the distance between the centroid and the example vector.

For each of the generated clusters, the present method sorts the dictionary terms in order of decreasing occurrence frequency within the cluster. It then determines a search space by selecting the top (or frequent) S dictionary terms, where S is a user specified value specifying the depth of search. Next, it chooses a set of L terms from the search space, where L is a user-specified value indicating the desired level of detail.

For each possible combination of L terms in the search space, the present method finds the number of examples containing all L terms. If this number is not null, and if the overlap between this set and all the other sets is less than an overlap value specified by user input, then this set of examples becomes a FAQ.

For each generated FAQ, the present method chooses a name based on the relevant terms in the order in which they occur most often in the text.

BRIEF DESCRIPTION OF THE DRAWINGS

The details of the present invention can be understood by referring to the accompanying drawings, in which like reference numbers and designations refer to like elements, wherein.

DETAILED DESCRIPTION OF THE PREFERRED EMBODIMENTS

Figure 1:
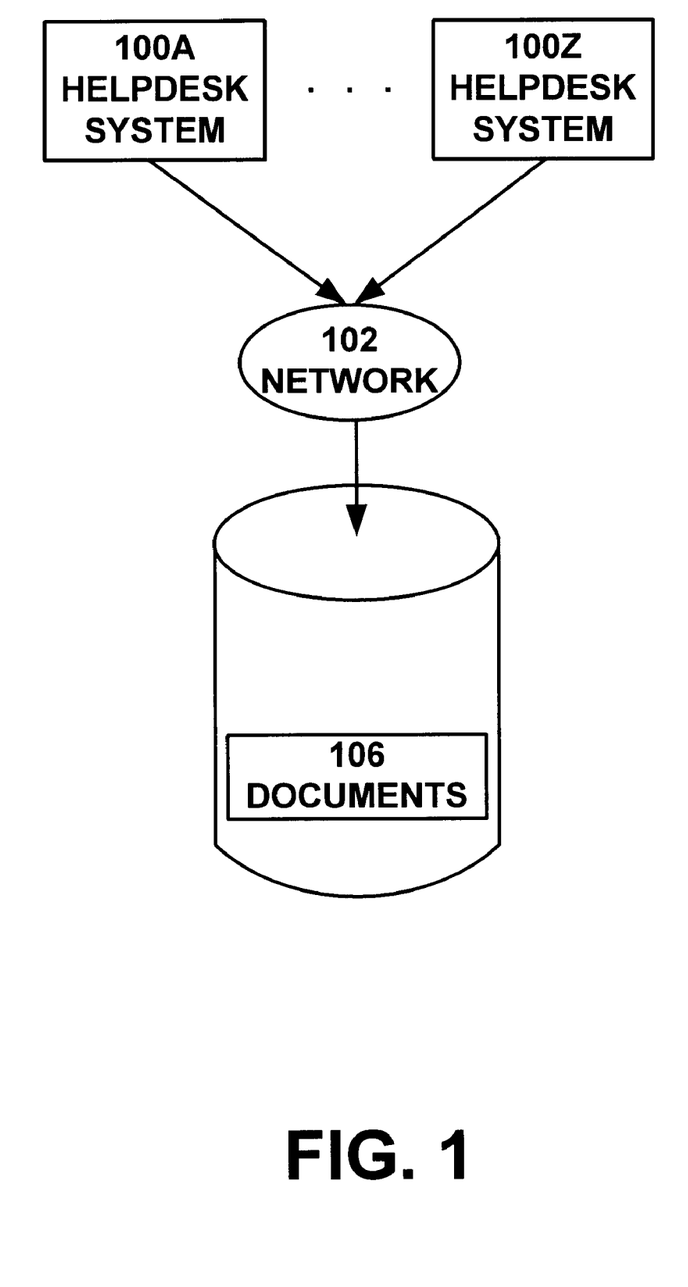
FIG. 1 is an exemplary block diagram of a networked database system in which the present system and method for defining frequently asked questions (FAQs) in a helpdesk data set, may be implemented according to the present invention.

An exemplary networked database system is shown in FIG. 1. The system includes database system 104, network 102, and a plurality of helpdesk systems 100A–100Z. The helpdesk systems 100A–100Z are communicatively connected to database system 104 by network 102. The helpdesk systems 100A–100Z keep a log of each question received at the helpdesk and its corresponding solution. These logs are then stored in the database system 104.

The helpdesk systems 100A–100Z may, in turn, obtain data from database system 104 by submitting queries through the network 104. The database system 104 performs the query operation by accessing data that satisfies the query conditions, and transmits the data to the requesting helpdesk system. Many types of data may be stored in database system 104, including data in the form of documents 106 that contain textual information, such as e-mail messages, categorizations of help desk problem tickets, and logical groupings of solutions by subject. The present invention applies to documents 106 that include information relating to answers and solutions to helpdesk inquiries and problems.

Figure 2:
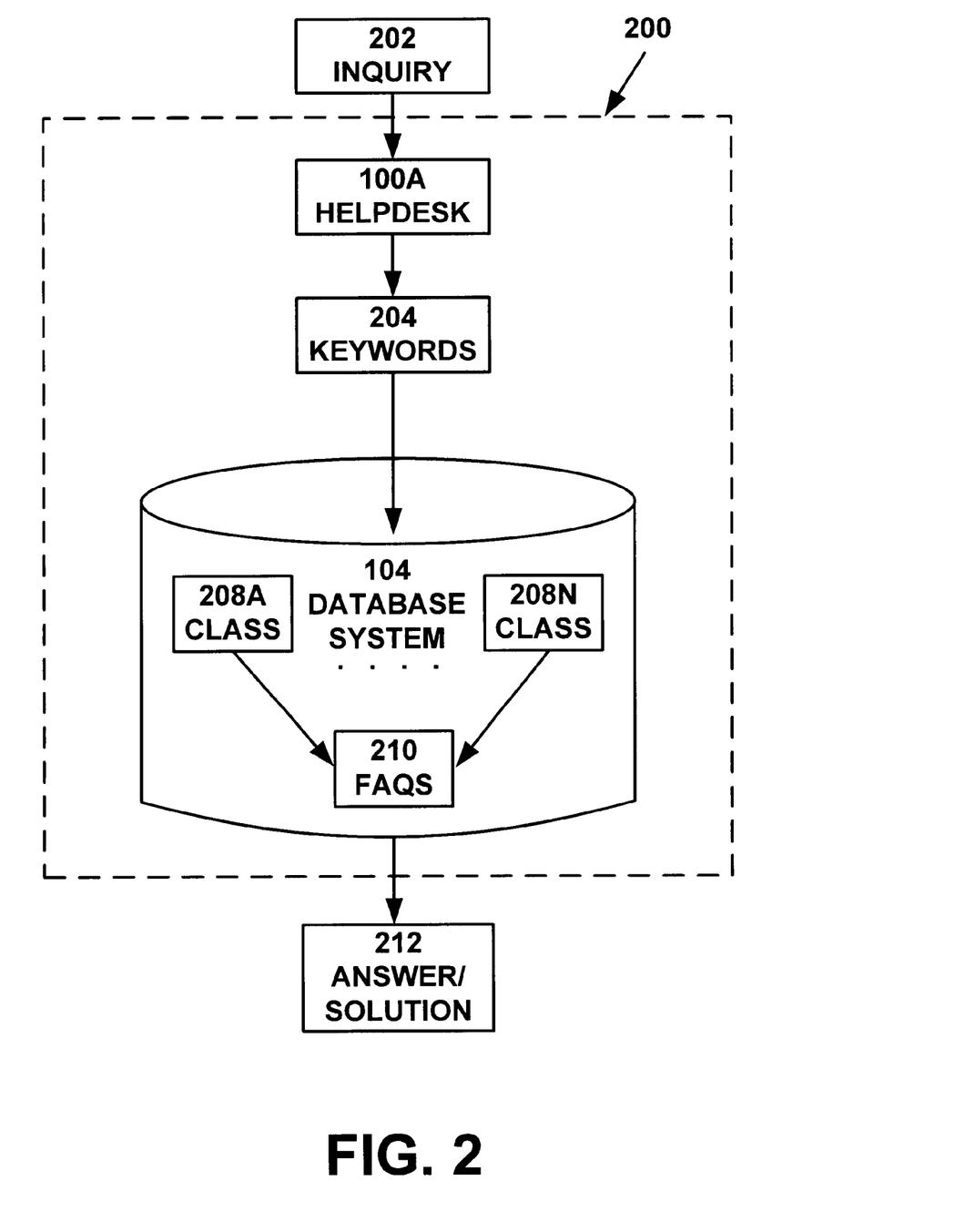
FIG. 2 is an exemplary implementation of the operation of a helpdesk, in which the present system and method may be used.

Documents 106 that are relevant to a particular point may be located by a variety of methods. In the context of providing helpdesk responses, a high level architecture of a system 200 for defining frequently asked questions (FAQs) in a helpdesk data set is illustrated in FIG. 2.

An inquiry 202, such as a question about or problem with operation of products, the performance of services, necessary procedures and forms, etc. is sent to the system 200 and is received by the helpdesk operator. Keywords 204 are extracted from the inquiry 202 and input into database system 104.

The keywords 204 may be extracted by the operator and entered into the database system 104. Alternatively, the entire inquiry may be entered and the keywords 204 automatically extracted. Database system 104 uses the input keywords 204 to select one or more classes 208A–208N that relate to FAQs 210.

Documents 106 (FIG. 1) are grouped into the plurality of classes 208A–208N according to particular criteria. In the context of a helpdesk, the criteria are typically to classify together documents 106 that are likely to provide answers or solutions to similar helpdesk inquiries.

As used herein, a "class" of documents is defined by an enumeration or listing of the set of documents 106 contained in the class. A class will also be described generally by a short phase or set of words that are most indicative of the set of documents 106 in the class. This phase or set of words is termed a class name.

Database system 104 selects one or more classes based on the input keywords 204. The selected class or classes 208A–208N then define a set of FAQs that are expected to provide the answer or solution 212 to the input inquiry 202.

Classes 208A–208N may be generated manually by a human user, who is typically an expert in the subject matter of the documents. However, manual class generation could be time-consuming and expensive. The present invention is a system and method for interactive classification and analysis of textual data, which automates much of the process of generating the classes, and thus provides savings in both time and expense.

The person who operates the present system 200 in order to interactively classify and analyze textual data is referred to herein as the "user," while the person who uses the resulting classification and analysis in order to operate a system such as a helpdesk is referred to as an "operator" of the helpdesk or another system.

Figure 3:
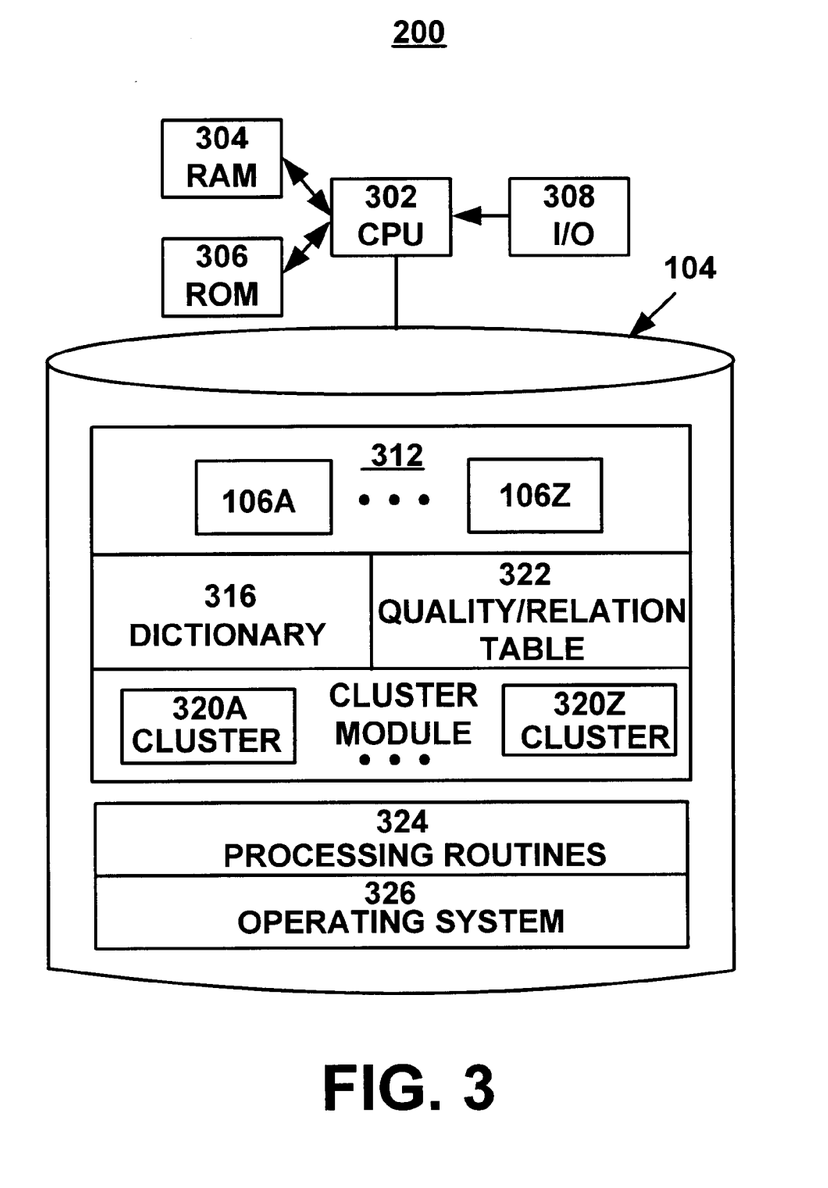
FIG. 3 is an exemplary block diagram of a computer system in which the present system and method may be implemented.

An exemplary system 200 in which the present invention may be implemented is shown in FIG. 3. System 200 includes central processing unit (CPU) 302, which is connected to random access memory (RAM) 304, read-only memory (ROM) 306, input/output devices (I/O) 308 and the database system 104. CPU 302 may include, for example, a microprocessor, a mini-computer, or a mainframe processor.

RAM 304 and ROM 306 store program instructions that are executed by CPU 302 and data that is used during program execution. I/O devices 308 may include any device used to input data to system 200, such as a keyboard, mouse, trackpad, trackball and graphics tablet, or to output data from system 200, such as a display and a printer, and to both input and output data, such as a modem and a network adapter.

The database system 104 includes stores data used by system 200, may comprise, for example, a random-access memory, a magnetic disk and/or optical disk, or a magnetic tape.

Database system 104 stores documents (or document set) 312, which includes one or more documents 106A–106Z. Each of these documents 106A–106Z is typically stored as one or more files. Each document 106A–106Z typically contains at least some text, but may also contain other types of information, such as numeric data, graphics, images, audio, or video.

Database system 104 further includes a dictionary 316 that contains a subset of the words contained in document set 312. A cluster module 318 partitions the documents set 312 into a plurality of clusters 320A–320Z. As used herein, a cluster is a grouping of documents in the document set 312 (i.e., documents 106A–106Z) containing similar words. Clusters are partitioned from among all of the documents 106A–106Z. A cluster quality/relation table 322 includes a cohesion score, distinctness score and size for each cluster, and allows the user to see quickly which clusters have the best or worst quality, and how the clusters 320A–320Z relate to each other.

Database system 104 further includes processing routines 324 that comprise program software routines executed by CPU 302, and that implement the processes of the present system 200, as it will be described later in connection with FIG. 5. The database system 104 also includes one or more operating systems 326.

Figure 4:
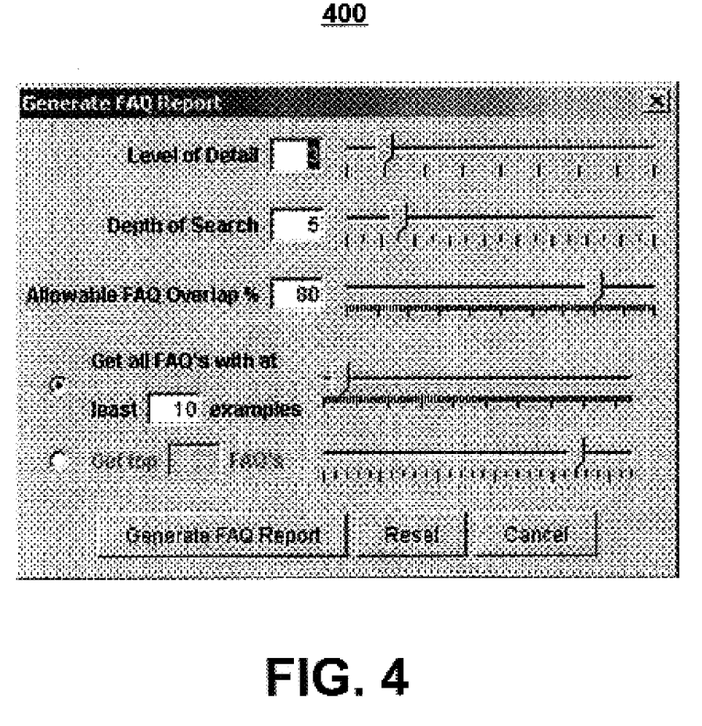
FIG. 4 is a snapshot of a graphical user interface where a user provides input parameters using the present system and method.

An exemplary snapshot 400 of a graphical user interface used by the user to input parameters affecting the generation of FAQs is shown in FIG. 4. Information such as the level of detail, the depth of search, the allowable FAQ overlap will be used to generate the FAQs.

Figure 5:
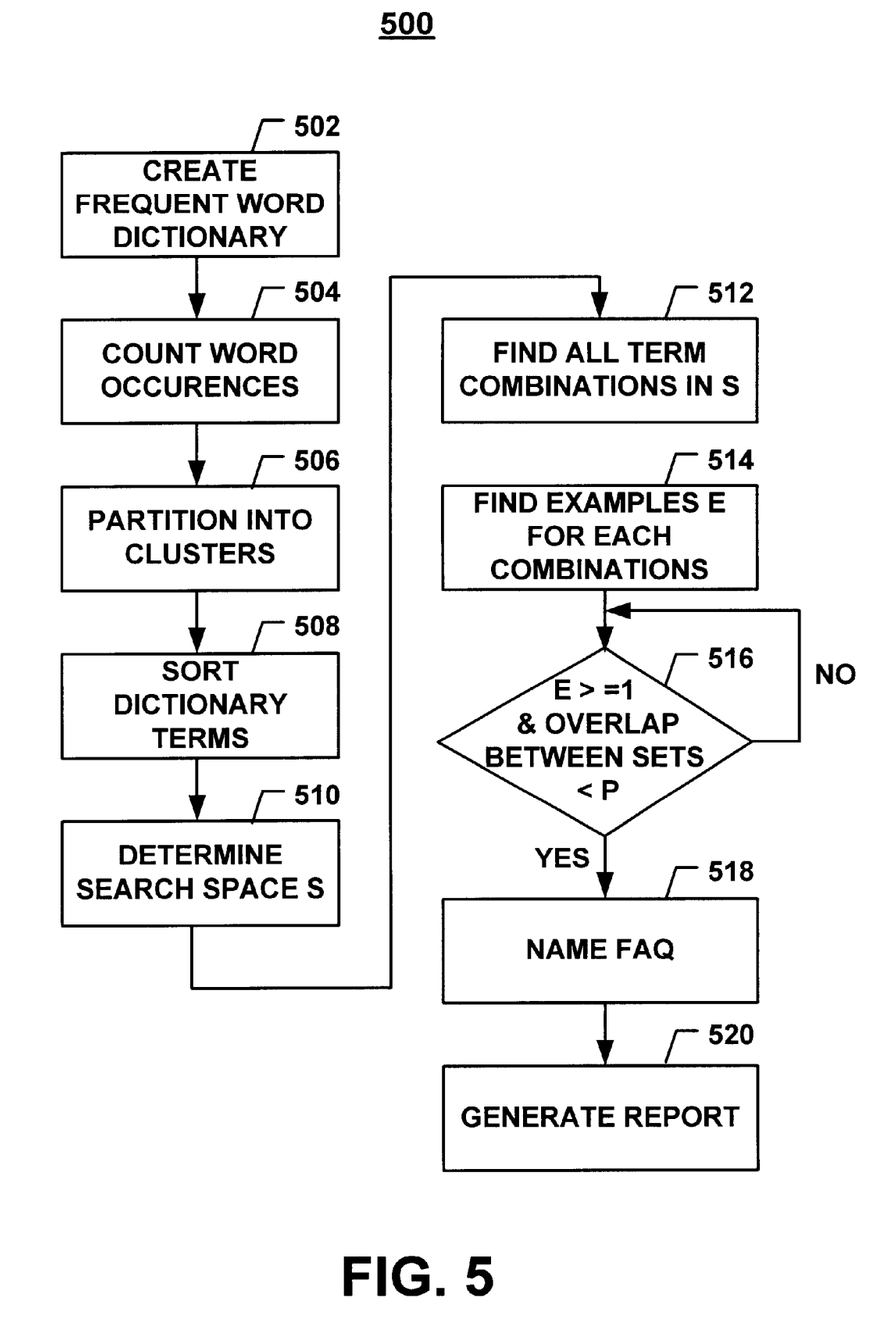
FIG. 5 is a flow diagram illustrating the operation of the system and method of the present invention.

FIG. 5 illustrates a method of operation 500 of the system 200. FIG. 5 is best viewed in conjunction with FIG. 6 that represents a data flow diagram 600 illustrating the information processing sequence according to the present invention.

Figure 6:
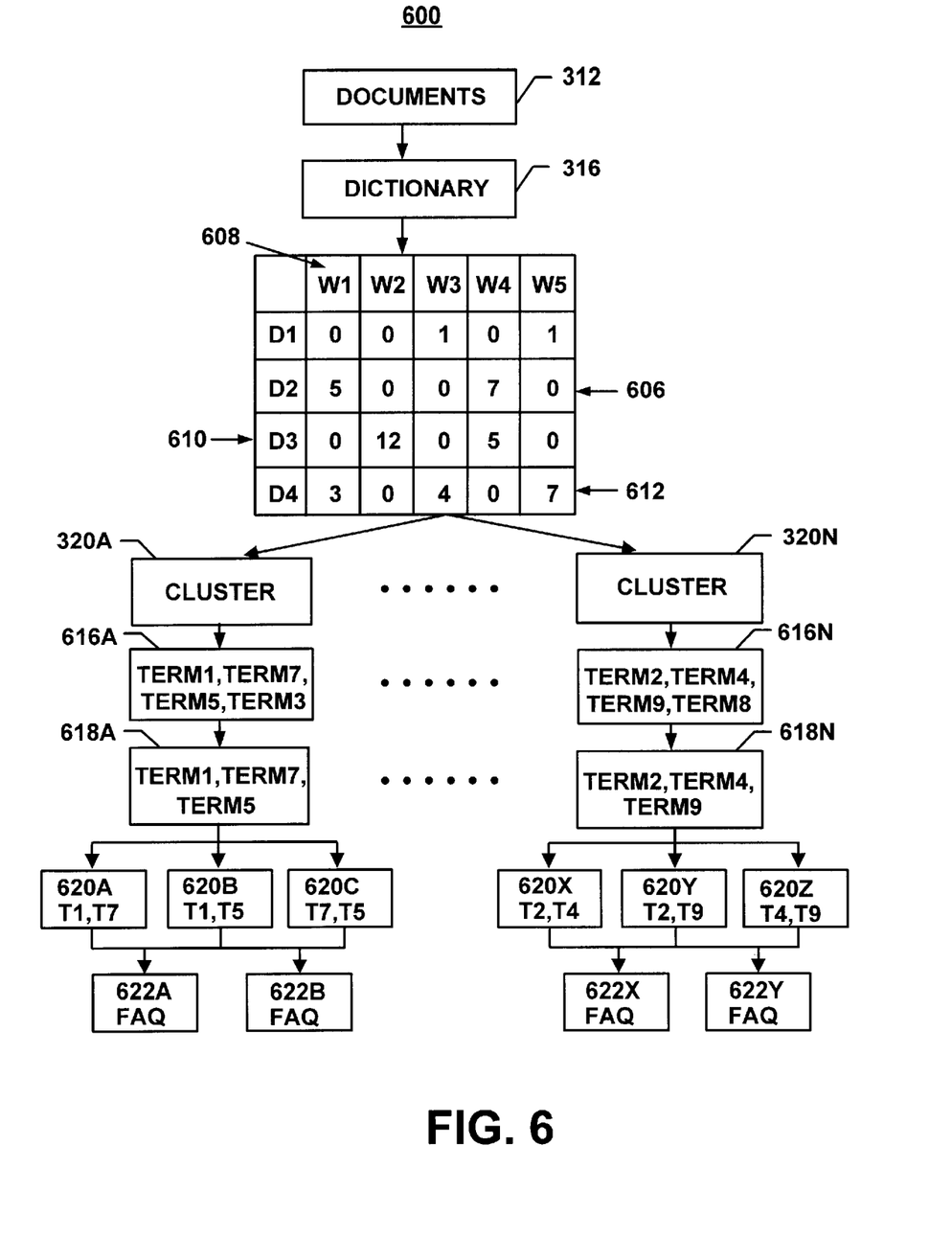
FIG. 6 is an exemplary data flow diagram resulting from the operation of FIG. 5.

Illustrated in FIG. 6, is a set of documents 312, wherein each document (106A–106Z) may be wholly or partially composed of text. At step 502 of FIG. 5, the dictionary 316 (FIG. 3) of frequently used words contained in the set of documents 312 is generated by identifying each word in the text of document set 312 and counting the number of documents 106A–106Z in which each word occurs. The most frequently occurring words are used to form dictionary 316.

At step 504 of FIG. 5, occurrences of words in common dictionary 316 are counted, resulting in the creation of a matrix 606 that is shown in FIG. 6. In matrix 606, each column, such as column 608, corresponds to a word in the dictionary 316, and each row, such as row 610, corresponds to an example.

Each entry, such as entry 612, in matrix 606 represents the number of times each dictionary word occurs in each example. Since many of these entries will, under normal circumstances, have a value of zero, the matrix 606 is termed sparse. In a preferred embodiment, this property of sparseness may be used by a compression scheme to greatly decrease the amount of storage required to hold the matrix in memory, while incurring only a relatively small cost in retrieval speed.

At step 506 of FIG. 5, the documents 106A–106Z are partitioned into clusters, such as clusters 320A–320N of FIG. 6, using known or available partitioning techniques. In a preferred embodiment, the well-known "k-means" procedure is used. In the k-means procedure, "k" is the number of clusters produced. This procedure provides automatic classification of data when no classification is known. Preferably, a means procedure is implemented using a cosine distance metric to determine the distance (d) between a centroid (X) and a document vector (Y):

$$d(X,Y) = -X \cdot Y / \|X\| \cdot \|Y\|$$

The number of clusters to produce, k, is an input to the procedure. This input may be provided by the user, or it may be generated based on the size of the document set or dictionary.

At step 508 of FIG. 5, the dictionary terms are sorted in order of decreasing relative occurrence frequency, F, within the cluster. This step is represented by blocks 616A–616N in FIG. 6. The relative occurrence frequency, F(T,C) of a dictionary term T within a cluster is calculated as follows:

$$F(T,C) = Tc/Nc - T/N,$$

where Tc is the number of documents in cluster C that contain term T, NC is the total number of documents in cluster C, T is the number of documents term T occurs in the entire document set, and N is the size of the entire document set. The terms are now sorted in decreasing order by this numeric F value. The order of the terms will thus be different in every cluster.

At step 510 of FIG. 5, the search space is determined by selecting the top S dictionary terms 618A–618N of FIG. 6. The value the user gave for S determines how many terms get selected for each cluster. These will be the first S terms in the ordering calculated at step 508 of FIG. 5, for each cluster.

At step 512 of FIG. 5, method 500 selects all possible combinations of L terms in the search space S, where L is the level of detail that is selected by the user. An exemplary data flow diagram is presented in blocks 620A–620C and 620X–620Y of FIG. 6.

At step 514 of FIG. 5, method 500 determines the number of examples, E, containing each combination of L terms as determined at step 512.

At decision step 516, method 500 determines if the set of examples generated at step 514 is eligible to become a FAQ. If E is at least one, and if the overlap between this set and all other sets is less than P, where P is a value specified by the user, then this set of examples becomes a FAQ. Eventually. Only the FAQs that reach a user-defined frequency (confidence) will be retained in the report 700. Blocks 622A–622B and 622X–622Y of FIG. 6 represent the equivalent step in the data flow diagram.

At step 518 of FIG. 5, method 500 names the FAQ based on the combination of L terms, listing those terms in the order in which they most frequently occur in the text. Method 500 then returns to step 508 and repeats steps 508–518, as described above, for each cluster, for the number of clusters.

Figure 7:
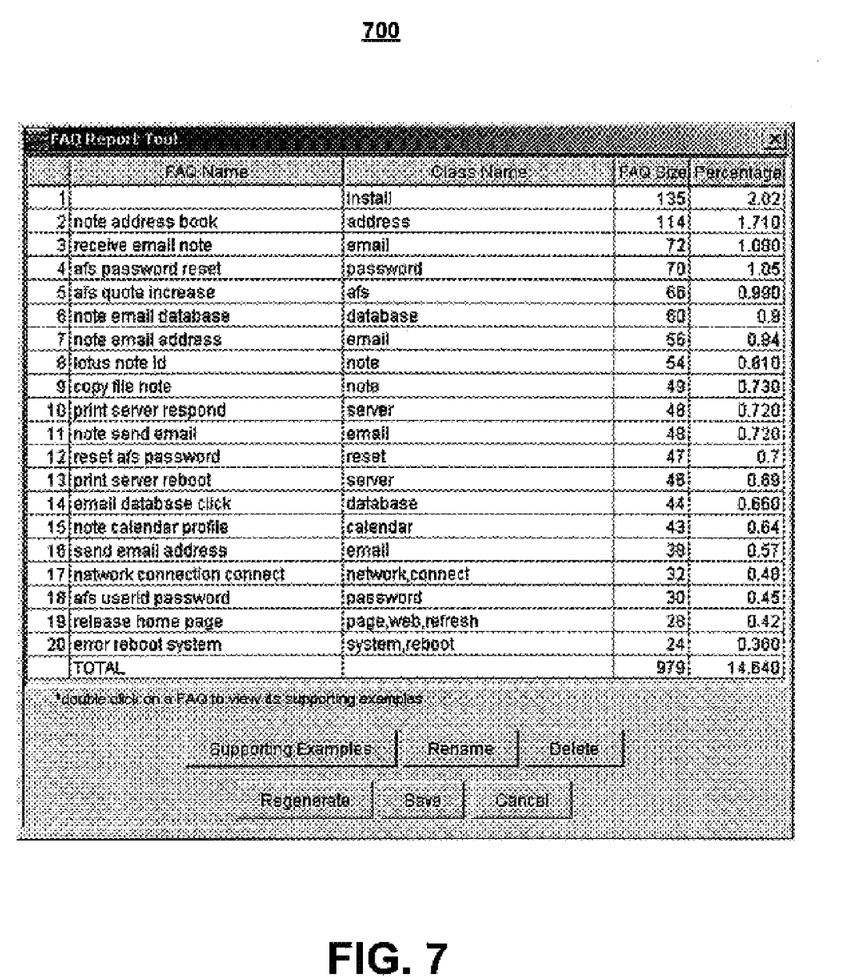
FIG. 7 is an exemplary report listing predefined parameters for each FAQ, such as its name, size, and so forth, that may be displayed to the user according to the present invention.

At step 520, method 500 writes a report listing the name of each FAQ generated and its size. An exemplary report 700 is illustrated in FIG. 7. The report 700 will only include the FAQs that occur with a frequency higher than a user specified minimum. Alternatively, the user may specify a fixed number of FAQs and then the report 700 will include the most frequent FAQs up to that number.

A particularly advantageous aspect of the present invention is the inclusion of similarity information in the display of individual documents in the cluster. The documents are sorted based on their similarity to the other documents in the cluster, or, alternatively, to a "typical" or "template" document in the cluster. Preferably, this is determined by calculating the distance of each document in the cluster to the centroid of the cluster. Documents may be sorted in order of descending distance, causing the more typical documents to be displayed first. This allows the user to determine the content of the documents in the cluster without having to look at all of the documents in order to do so. This saves the user considerable time, and expense.

It is important to note that while the documents discussed in this invention are helpdesk problem reports, labeled as examples in the figures, the present invention is applicable to other types of documents as well. Also, it is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of signal bearing media actually used to carry out the distribution. Examples of computer readable media include recordable-type media such as floppy disc, a hard disk drive, RAM, and CD-ROMs, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for automatically classifying frequently asked questions, comprising:

generating a dictionary including a subset of words contained in a document set based on a frequency of occurrence of each word in the document set;

generating a count of occurrences of each word in the dictionary within each document in the document set;

partitioning the set of documents into a plurality of clusters, each cluster containing at least one document;

for each cluster, sorting dictionary terms with reference to occurrence frequency within the cluster;

determining a search space by selecting candidate dictionary terms within a desired depth of search;

selecting a plurality of terms from the candidate dictionary terms that correspond to a predetermined level of detail;

identifying a set of examples containing the selected set of terms;

setting the identified set of examples as a frequently asked question;

wherein setting the identified set of examples includes the step of determining if the number of identified set of examples exceeds zero; and wherein if the number of identified set of examples exceeds zero, selecting an overlap between the identified set of examples and other sets of examples is less than a predetermined value, P, then setting the identified set of examples as a frequently asked question.

2. The method of claim 1, wherein setting the identified set of examples further includes removing frequently asked questions whose frequencies occur below a user-selected confidence.

3. The method of claim 2, further including specifying the user-selected confidence by defining a maximum number of frequently asked questions.

4. The method of claim 3, further including generating a centroid for each cluster in the search space; and wherein if the number of identified set of examples exceeds zero, comparing the identified set of examples to the centroid.

5. The method of claim 3, further including preparing a report listing frequently asked questions having the user-selected confidence.

6. The method of claim 1, wherein sorting includes sorting the dictionary terms in order of decreasing occurrence frequency within the cluster.

7. The method of claim 1, further including generating a name for each cluster.

8. The method of claim 1, further including displaying a table including a name of each cluster and a frequency of occurrence of the frequently asked question.

9. A system for automatically classifying frequently asked questions, comprising:

a dictionary including a subset of words contained in a document set based on a frequency of occurrence of each word in the document set;

a count of occurrences of each word in the dictionary generated within each document in the document set;

a cluster module that partitions the set of documents into a plurality of clusters, each cluster containing at least one document, wherein dictionary terms for each cluster are sorted with reference to occurrence freguency;

a processing routine that determines a search space by selecting candidate dictionary terms within a desired depth of search, and that selects a plurality of terms from the candidate dictionary terms that correspond to a predetermined level of detail;

wherein the processing routine selects a set of examples containing the selected set of terms;

wherein the processing routine further sets the identified set of examples as a frequently asked question, and determines if the number of identified set of examples exceeds zero; and wherein if the number of identified set of examples exceeds zero, the processing routine selects an overlap between the identified set of examples and other sets of examples is less than a predetermined value, P, then sets the identified set of examples as a frequently asked question.

10. The system of claim 9, further including a database system that generates a centroid for each cluster in the search space.

11. The system of claim 10, wherein if the number of identified set of examples exceeds zero, the database system compares the identified set of examples to the centroid.

12. The system of claim 9, wherein the processing routine prepares a report listing frequently asked questions having a user-selected confidence.

13. The system of claim 9, wherein the cluster module sorts the dictionary terms in order of decreasing occurrence frequency within the cluster.

14. The system of claim 10, wherein the database system generates a name for each cluster.

15. The system of claim 9, further including a display that displays a table including a name of each cluster and a frequency of occurrence of the frequently asked question.

16. A computer program product for automatically classifying frequently asked questions, comprising:

a dictionary including a subset of words contained in a document set based on a frequency of occurrence of each word in the document set;

means for generating a count of occurrences of each word in the dictionary within each document in the document set;

means for partitioning the set of documents into a plurality of clusters, each cluster containing at least one document, means for sorting dictionary terms for each cluster with reference to occurrence frequency;

means for determining a search space by selecting candidate dictionary terms within a desired depth of search, and that selects a plurality of terms from the candidate dictionary terms that correspond to a predetermined level of detail, wherein the means for determining the search space identifies a set of examples containing the selected set of terms;

wherein the means for determining the search space further sets the identified set of examples as a frequently asked question, and determines if the number of identified set of examples exceeds zero; and wherein if the number of identified set of examples exceeds zero, means for determining the search space selects an overlap between the identified set of examples and other sets of examples is less than a predetermined value, P, then sets the identified set of examples as a frequently asked question.

17. The computer program product of claim 16, further including means for generating a centroid for each cluster in the search space.

18. The computer program product of claim 17, wherein if the number of identified set of examples exceeds zero, the means for determining the search space compares the identified set of examples to the centroid.

19. The computer program product of claim 16, further including means for preparing a report listing frequently asked questions having a user-selected confidence.

20. The computer program product of claim 16, wherein the means for sorting sorts the dictionary terms in order of decreasing occurrence frequency within the cluster.

21. The computer program product of claim 16, further including means for generating a name for each cluster.

22. The computer program product of claim 16, further including means for displaying a table including a name of each cluster and a frequency of occurrence of the frequently asked question.

* * * * *